UNITED STATES PATENT OFFICE.

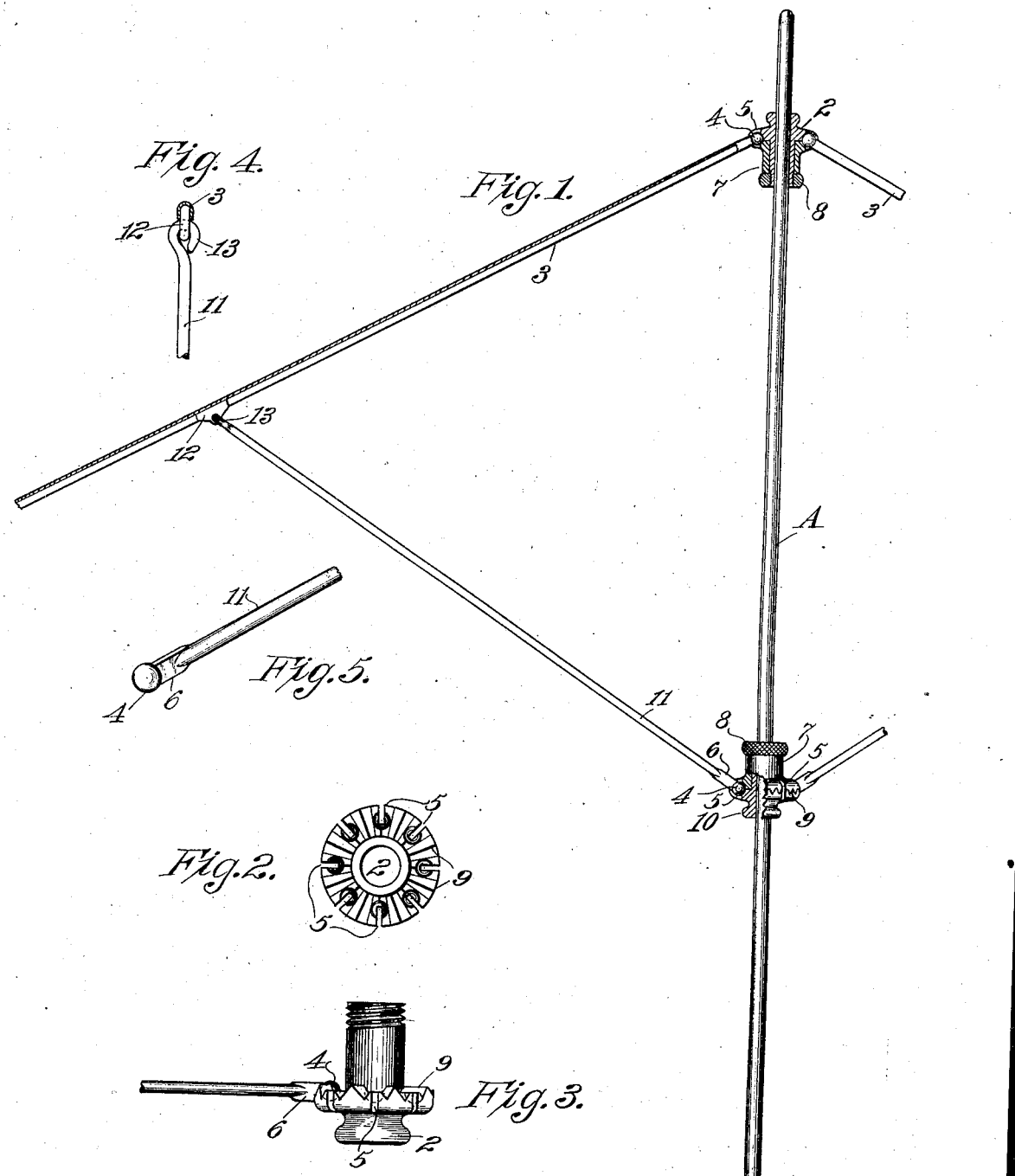

FRANK X. LOUGHERY, SR., OF SANTA ROSA, CALIFORNIA.

UMBRELLA.

No. 849,845.   Specification of Letters Patent.   Patented April 9, 1907.

Application filed February 5, 1906. Serial No. 299,460.

*To all whom it may concern:*

Be it known that I, FRANK X. LOUGHERY, Sr., a citizen of the United States, residing at Santa Rosa, in the county of Sonoma and State of California, have invented new and useful Improvements in Umbrellas, of which the following is a specification.

My invention relates to improvements in umbrellas, parasols, and like articles.

It consists in means for connecting the ribs and centrally fixed and slidable hubs and intermediate spreaders and in details of construction, which will be more fully explained by reference to the accompanying drawings, in which—

Figure 1 is a view showing a portion of an umbrella-frame with my improvements. Figs. 2 and 3 are plan and side views of the hub. Fig. 4 shows the connections between the rib and spreader, and Fig. 5 is a perspective view of a member.

A represents the staff of the umbrella, having at the upper end a fixed hub or support 2, with which the convergent ends of the ribs 3 are connected as follows: The hub 2 is slotted or channeled at intervals around the periphery, there being as many of these slots or channels as there are to be ribs 3.

The ends of the ribs are made globular, as shown at 4, and the inner ends of the channels 5 have corresponding globular concavities, into which the ends 4 are fitted and within which they are turnable. The part 6, contiguous to the globular end, enters the slot or channel 5 in each case, and the rib is thus prevented from turning. In order to readily admit and remove these connections, I have shown a slidable flange or collar 7, which is movable upon the hub extension, so as to be withdrawn from or approached to the hub 2. Beneath this collar is a milled screw 8, turnable upon a threaded extension of the hub 2, over which the collar 7 fits.

The collar 7 is slotted coincidently with the slots in the hub 2 and has one half of the cavity which receives the ball 4 made in it, the other half being made in the flange of the hub 2, so that when the globular heads of the ribs are in place the sleeve or collar is pushed up, thus inclosing the heads 4, and by screwing up the nut 8 the parts will be held firmly together, while the ribs will have a free movement of the head ends.

In order to insure the proper alinement of the slots in the flange of the hub and the corresponding flange in each collar, I have shown the meeting faces of the two parts as having coincident engaging notches or projections of any suitable description, as shown at 9, and it will be readily seen that when these teeth or notches are properly engaged they will bring the slots 5 in the upper and lower parts in alinement, so as to properly receive and guide the rib ends. Then the nut being screwed up will lock them and prevent any slippage.

The slidable hub 10 is similarly constructed to the one fixed at the head of the staff and is movable upon the staff in the usual manner.

The inner ends of the spreaders 11 are made with globular heads in like manner with the upper ends of the ribs, and these ends of the spreaders are engaged with the slidable hub or ferrule 10 in a similar manner, operating in all respects like that previously described.

The outer ends of the spreaders 11 are connected with the ribs 3 as follows: The ribs are of the usual grooved or channel metal, and at the point where the spreaders are to connect with them a solid piece of metal is preferably brazed or otherwise fixed in the channel of the rib, as shown at 12. The ends of the spreaders 11 are slightly reduced and bent into hook form, as shown at 13, and pass through holes made transversely through the rib or the filling-piece 12, which piece may project inwardly from the rib for this purpose.

It will be seen that by this construction the outer surface of the rib is perfectly smooth, having no projection or roughness to wear and destroy the covering of the umbrella, and the umbrella may be made without the usual attachments which are fixed to the ribs for the connection of the spreaders, and which attachments projecting as they do, serve to rapidly wear away the covering material of the umbrella.

It will be seen that all these parts of the umbrella may be disengaged and dismounted with very little trouble.

Having thus described my invention, what I claim, and desire to secure by Letters Patent, is—

1. In an umbrella, the combination of a hub fixed to the umbrella-staff, a hub slidable on said staff, said upper hub having a circumferential row of sockets, and said slidable hub having a slotted and globularly-chambered flange, a collar slidable on said slidable hub and having a corresponding slotted flange and sockets in said flange, ribs having heads fitting the sockets of the fixed hub, spreaders having globular heads fitting the sockets of the slidable hub, said spreaders being flattened contiguous to the heads whereby the spreaders are guided and turnable in the slots of the flanges.

2. In an umbrella, the combination with a hub slidable upon the umbrella-staff said hub having a circumferential row of sockets, and spreaders having globular heads fitting said sockets, of a hub fixed to the upper end of the staff and having a slotted and globularly-chambered flange, a collar circumscribing and slidable on said slidable hub, and having a corresponding slotted flange and sockets therein, ribs having heads fitting the sockets of the fixed hub and having portions contiguous to said heads flattened whereby the ribs are guided and turnable in the slots of the flanges, and a nut threaded in the lower end of the fixed hub and bearing up under the collar which surrounds said hub.

3. In an umbrella, a hub fixed to the head of the umbrella-staff, a similar hub slidable on said staff, each having slotted and globularly-chambered flanges, collars slidable upon the hubs and having corresponding slotted flanges and sockets in said flanges, ribs having globular heads fitting the sockets and flattened contiguous portions guided and turnable in the slots, corrugated edges formed upon the contiguous flanges and adapted to engage when the slots of the two are in line, and a threaded nut whereby the parts are locked in position.

In testimony whereof I have hereunto set my hand in presence of two subscribing witnesses.

FRANK X. LOUGHERY, Sr.

Witnesses:
S. H. NOURSE,
D. B. RICHARDS.